United States Patent
Oh et al.

(10) Patent No.: US 9,403,525 B2
(45) Date of Patent: Aug. 2, 2016

(54) SYSTEM AND METHOD OF CONTROLLING SHIFT

(71) Applicants: Hyundai Motor Company, Seoul (KR); Kia Motors Corporation, Seoul (KR)

(72) Inventors: Kyoung Cheol Oh, Gyeonggi-do (KR); Seung Han Lee, Gyeonggi-do (KR); Teh Hwan Cho, Gyeonggi-do (KR); Donghoon Kang, Gyeonggi-do (KR); Jee Wook Huh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 57 days.

(21) Appl. No.: 14/320,954

(22) Filed: Jul. 1, 2014

(65) Prior Publication Data

US 2015/0006046 A1  Jan. 1, 2015

(30) Foreign Application Priority Data

Jul. 1, 2013  (KR) .................. 10-2013-0076707

(51) Int. Cl.
*B60W 10/11* (2012.01)
*F16H 61/04* (2006.01)
*B60W 20/00* (2016.01)
(Continued)

(52) U.S. Cl.
CPC ............. *B60W 10/11* (2013.01); *B60W 20/17* (2016.01); *B60W 10/02* (2013.01); *B60W 10/06* (2013.01); *B60W 10/08* (2013.01); *B60W 20/30* (2013.01); *B60W 2510/18* (2013.01); *F16H 2061/0422* (2013.01); *F16H 2061/0481* (2013.01);
(Continued)

(58) Field of Classification Search
CPC ..... B60W 20/30; B60W 10/02; B60W 10/06; B60W 10/08; B60W 20/1084; B60W 2510/18; B60W 10/11; F16H 2061/0481; F16H 2061/0422; Y10T 477/24; Y10T 477/26; Y10T 477/647
USPC ................ 477/4, 5, 94; 701/22, 53, 54, 60, 61
See application file for complete search history.

(56) References Cited

U.S. PATENT DOCUMENTS 5,441,464 A * 8/1995 Markyvech ............ B60W 10/11 477/109
6,383,114 B1 * 5/2002 Hoshiya .................. B60K 6/365 477/111

(Continued)

FOREIGN PATENT DOCUMENTS

JP    07301323        11/1995
JP    2002-308077 A   10/2002
(Continued)

OTHER PUBLICATIONS

English Translation of JP2002308077A; http://worldwide.espacenet.com; Jan. 13, 2016.*

*Primary Examiner* — Roger Pang
(74) *Attorney, Agent, or Firm* — Mintz Levin Cohn Ferris Glovsky and Popeo, P.C.; Peter F. Corless (57) ABSTRACT

A shift control system and method that determine whether an ABS is operating in a running vehicle to operate a transmission of the vehicle are provided. The system determines whether the vehicle can be shifted to a neutral stage (N) based on vehicle conditions. A shift control signal is then generated and transmitted to a transmission to execute a shift of the vehicle to the stage N.

17 Claims, 5 Drawing Sheets

(51) Int. Cl.
*B60W 10/08* (2006.01)
*B60W 10/06* (2006.01)
*B60W 10/02* (2006.01)

(52) U.S. Cl.
CPC .............. *Y10T477/24* (2015.01); *Y10T 477/26* (2015.01); *Y10T 477/647* (2015.01)

(56) References Cited

U.S. PATENT DOCUMENTS

| | | | | |
|---|---|---|---|---|
| 2001/0022245 | A1* | 9/2001 | Rogg | B60K 6/365 180/65.21 |
| 2003/0119628 | A1* | 6/2003 | Jager | B60T 7/122 477/71 |
| 2010/0009808 | A1* | 1/2010 | Ohtsu | B60T 8/17616 477/185 |
| 2012/0046840 | A1* | 2/2012 | Monsere | B60W 10/11 701/53 |
| 2012/0089281 | A1* | 4/2012 | Sah | B60T 8/175 701/22 |

FOREIGN PATENT DOCUMENTS

| | | |
|---|---|---|
| KR | 10-0820489 | 4/2008 |
| KR | 10-1145622 | 5/2012 |

* cited by examiner

SYSTEM AND METHOD OF CONTROLLING SHIFT

CROSS-REFERENCE TO RELATED APPLICATION

This application claims priority to and the benefit of Korean Patent Application No. 10-2013-0076707 filed in the Korean Intellectual Property Office on Jul. 1, 2013, the entire contents of which are incorporated herein by reference.

BACKGROUND (a) Field of the Invention

The present invention relates to a shift control system and a method thereof.

(b) Description of the Related Art

In a general hybrid vehicle, an engine and a motor are separated when an anti-lock brake system (ABS) operates, and vibration of the vehicle body is reduced by controlling motor torque. However, in the hybrid vehicle, high wheel vibration occurs more frequently compared to ordinary vehicles. In addition, when the ABS operates in rapid braking or on a road having less friction, vibration and noise are generated from a brake pressure control device. Further, a braking force transmitted to the wheels is rapidly changed, thereby generating more vibration, and the hybrid vehicle does not use a torque converter and thus, vibration transmitted to the vehicle body cannot be absorbed.

The above information disclosed in this section is merely for enhancement of understanding of the background of the invention and therefore it may contain information that does not form the prior art that is already known in this country to a person of ordinary skill in the art.

SUMMARY

The present invention provides a shift control system that may prevent wheels from being locked due to a braking force applied to the wheels during braking, and a method thereof.

A system that controls a shift of a vehicle according to an exemplary embodiment of the present invention may include: a brake operation determiner configured to determine whether an anti-lock brake system (ABS) of the vehicle is operating; a shift control determiner configured to determine whether shifting to a neutral stage (N) is possible based on information regarding vehicle conditions after operating a transmission in response to determining that the ABS of the vehicle is operating; and a shift controller configured to generate a shift control signal and transmit the shift control signal to the transmission in response to determining that the vehicle may be shifted to the stage N.

The shift control determiner may be configured to operate the transmission after releasing an engine clutch without control of an engine output and a motor output, operate the transmission after adjusting the engine output and the motor output and releasing the engine clutch, or adjust the engine output and the motor output without releasing the engine clutch. The shift control determiner may be configured to adjust the engine output and the motor output to be about zero, respectively. The shift control determiner may further be configured to adjust the sum of the engine output and the motor output to be about zero. The information regarding the vehicle conditions may include information on vehicle speed, a gear shift ratio, a fluid temperature, a motor torque, and an engine torque. The brake operation determiner may be configured to determine whether the ABS is operating by sensing wheel speed of the vehicle. The brake operation determiner may be an electric brake system (EBS) and the shift control determiner may be a hybrid control unit (HCU).

A method for a shift control system to control a shift of a vehicle according to another exemplary embodiment of the present invention may include: determining whether an anti-lock brake system (ABS) is operating in a running (e.g., traveling) vehicle; when the ABS is operating, operating a transmission of the vehicle to determine whether the vehicle may be adjusted to stage N based on information regarding vehicle conditions; and in response to determining that the vehicle may be adjusted to the stage N, generate a shift control signal and transmit the signal to the transmission.

The transmission may be operated after releasing an engine clutch without adjusting engine output and motor output, or the transmission may be operated after adjusting the engine output and the motor output and releasing the engine clutch. The engine output and the motor output may be respectively adjusted to be about zero. A sum of the engine output and the motor output may be adjusted to be about zero. The information regarding the vehicle conditions may include information regarding vehicle speed, a gear shift ratio, a fluid temperature, a motor torque, and an engine torque.

The determination of whether the shift of the vehicle may be adjusted to the stage N may include determining whether the vehicle speed is greater than a predetermined vehicle speed, determining whether the gear shift ratio is within a predetermined gear shift ratio, determining whether the fluid temperature is within a predetermined fluid temperature range, and determining whether the motor torque and the engine torque are less than predetermined values. The determination of whether the ABS of the vehicle is operating may be performed by sensing wheel speed.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following detailed description, exemplary embodiments of the present invention have been shown and described, simply by way of illustration. As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification.

Hereinafter, a shift control system and a method thereof according to an exemplary embodiment of the present invention will be described with reference to the accompanying drawings.

Figure 1A:
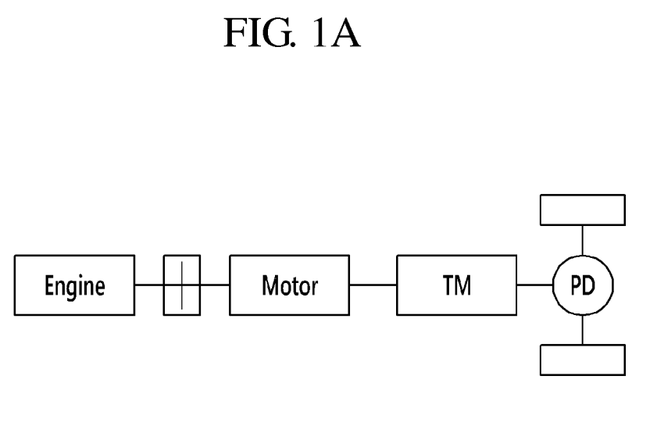
FIGS. 1A-1B are exemplary schematic diagrams of a general hybrid vehicle in a running state and an ABS operating state according to the related art.
Figure 1B:
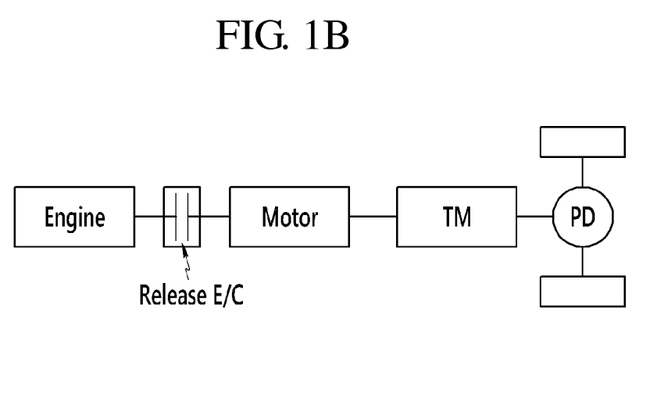
Figure 2A:
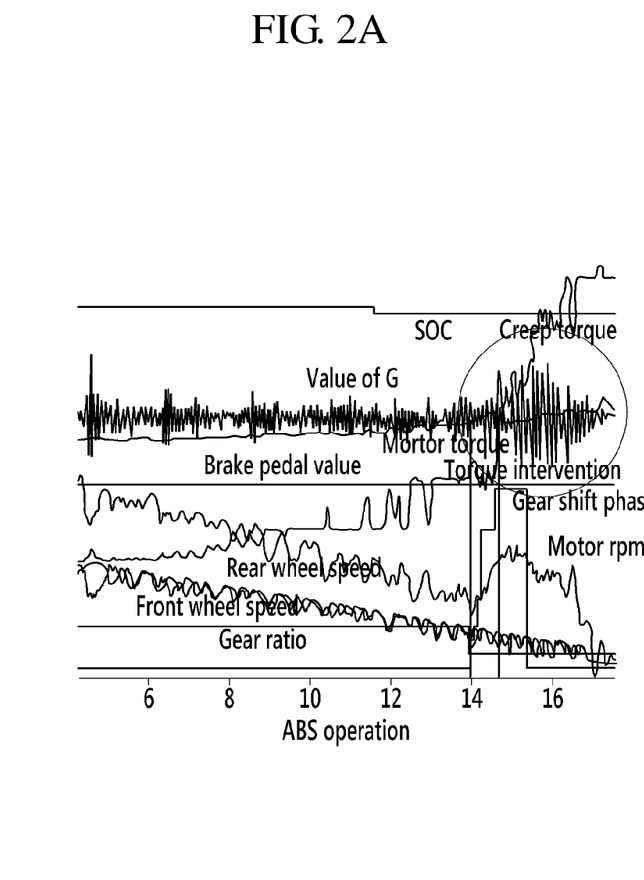
FIGS. 2A-2B are exemplary graphs illustrating generation of vehicle vibration due to a remaining motor torque in the general hybrid vehicle according to the related art.
Figure 2B:
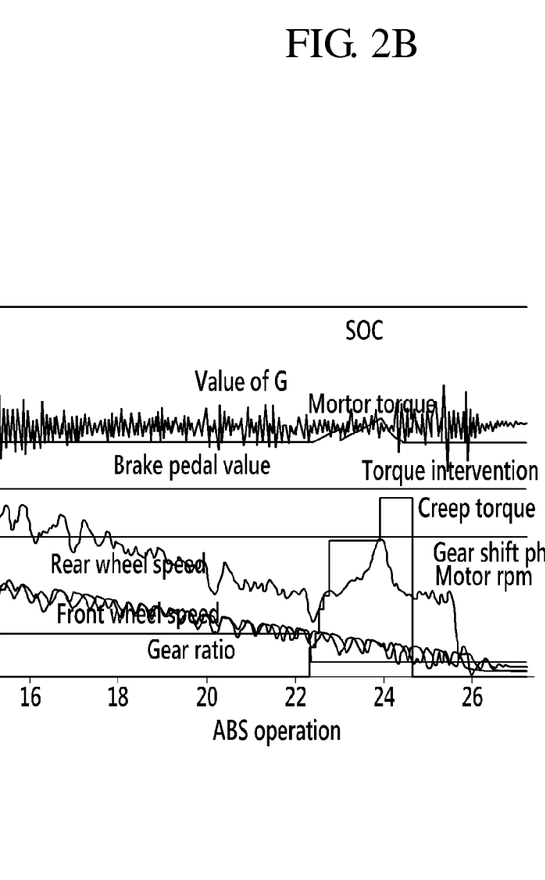

Operation of a general hybrid vehicle will be described first with reference to FIGS. 1A-1B and FIGS. 2A-2B. FIGS. 1A-1B are exemplary schematic diagrams of a general hybrid vehicle in a running state and in an ABS operating state, and FIGS. 2A-2B are exemplary graphs illustrating generation of vehicle vibration due to a remaining motor torque in the general hybrid vehicle. First, as shown in FIG. 1A, when the hybrid vehicle is in a running state, an engine and a motor are connected and the vehicle runs using power of the engine and/or motor. However, when the ABS is operating, the engine is separated from the motor and the motor torque is adjusted for braking of the vehicle, as shown in FIG. 1B.

As shown in FIGS. 2A-2B, when there is a remaining motor torque, the vehicle speed may change abruptly, thereby causing variation of a creep torque. Therefore, as shown in FIGS. 2A-2B, the variation of the creep torque causes variation of motor torque, thereby generating rattling of the vehicle. Accordingly, the motor torque may be adjusted to be about zero to reduce vibration. In the exemplary embodiment of the present invention, a shift control system and a method for adjusting the transmission to be in the neutral (N) range to reduce vibration of the vehicle body will now be described.

Figure 3:
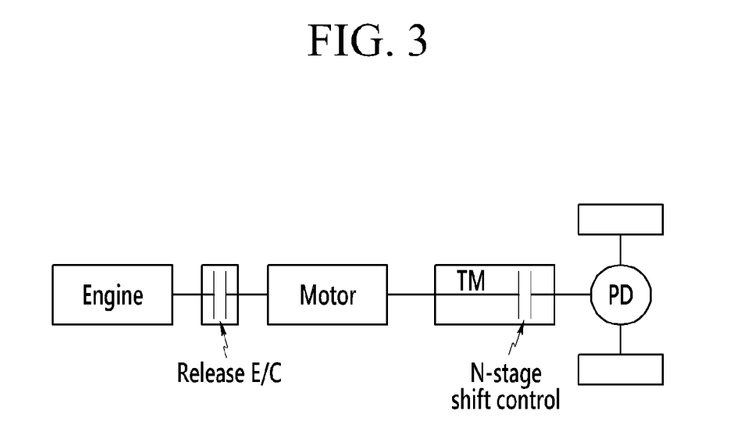
FIG. 3 is an exemplary schematic diagram of a vehicle according to an exemplary embodiment of the present invention.

FIG. 3 is an exemplary schematic diagram of a vehicle according to an exemplary embodiment of the present invention. As shown in FIG. 3, the hybrid vehicle according to the exemplary embodiment of the present invention uses an engine and a motor as power sources. As an engine, a gasoline engine or a diesel engine may be used, but this is not restrictive. An engine clutch (E/C) may be disposed between the engine and the motor. The engine clutch (E/C) may be configured to selectively connect the engine and the motor. The motor may be directly connected to a transmission TM, and the transmission TM may be configured to convert power from the engine and/or motor and transmit the converted power to driving wheels.

In the hybrid vehicle according to the exemplary embodiment of the present invention, when an ABS is operating, a controller may be configured to determine whether the vehicle speed may be shifted to the stage N. When the shift may be operated to be the stage N, the controller may be configured to perform shift control to the N stage. Accordingly, vibration of the vehicle body may be reduced to improve the sense of braking of the vehicle. In other words, according to a conventional art, although the engine clutch E/C is released, the vehicle speed is maintained with the drive stage (D) causing an increase in the wheel vibration. However, in the present exemplary embodiment, when the engine clutch E/C is released, the gear shift may be adjusted to the stage N to reduce such vibration. The shift control system 100 providing the above-stated effect will now be described with reference to FIG. 4.

Figure 4:
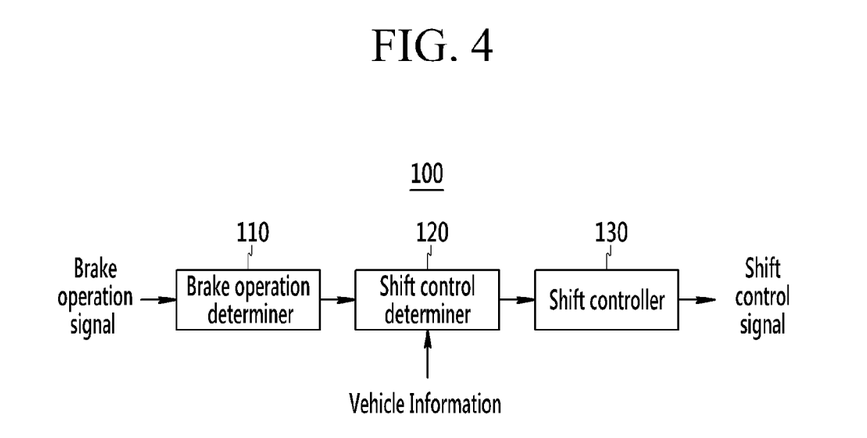
FIG. 4 is an exemplary lock diagram of a shift control system according to the exemplary embodiment of the present invention.

FIG. 4 is an exemplary block diagram of the shift control system according to the exemplary embodiment of the present invention. As shown in FIG. 4, the shift control system 100 may include a brake operation determiner 110, a shift control determiner 120, and a shift controller 130. The brake operation determiner 110, the shift control determiner 120, and the shift controller 130 may be respectively realized as individual controllers or may be realized as a single controller having a processor and a memory.

The brake operation determiner 110 may be configured to determine whether the ABS is operating by sensing the wheel speed using a wheel speed sensor. In particular, the brake operation determiner 110 may be an electric brake system (EBS), but the exemplary embodiment of the present invention is not limited thereto. Additionally, the brake operation determiner 110 may be configured to determine the ABS operation based on the wheel speed using various methods, and the exemplary embodiment of the present invention is not limited to any one of the methods.

When the brake operation determiner 110 determines that the ABS is operating, the shift control determiner 120 may be configured to operate the transmission. In general, the operation of the transmission implies operation of constituent elements in the transmission for execution of a desired gear shift stage. Such transmission control may include adjusting the engine torque, the motor torque, and the engine clutch E/C to adjust an engine output and/or a motor output. The shift control determiner 120 may be configured to operate the transmission after releasing the engine clutch without adjusting the engine output and the motor output, and may be configured to operate the transmission after adjusting the engine output and the motor output and releasing the engine clutch. Alternatively, the shift control determiner 120 may be configured to adjust the engine output and the motor output without releasing the engine clutch.

The exemplary embodiment of the present invention is not limited to any one of the above-stated transmission control methods. When the engine output and the motor output are adjusted and then the engine clutch is released, the engine output and the motor output may be adjusted to be about zero and then the engine clutch may be released. Accordingly, impact from the shift control to the stage N may be reduced. Alternatively, the gear may be shifted to the stage N after adjusting the sum of the engine output and the motor output is adjusted to be about zero.

After operating the transmission, the shift control determiner 120 may be configured to determine whether the gear may be shifted to the stage N based on state information of the vehicle, input from an external source. For this, the shift control determiner 120 may be a hybrid control unit (HCU) in the exemplary embodiment of the present invention, but this is not restricted thereto. The vehicle condition information may exemplarily include information regarding vehicle speed, a gear shift ratio that indicates a ratio between speed input of the transmission and speed output of the transmission, a fluid temperature collected from an automatic transmission fluid (ATF), a motor torque, and an engine torque. In addition, a method for collecting each of the pieces of information is known to a person skilled in the art, and therefore no further description will be provided in the exemplary embodiment of the present invention. When the shift control determiner 120 determines that the gear may be shifted to the stage N, the shift controller 130 may be configured to generate a control signal that informs shifting of the transmission to the stage N. The control signal may be transmitted to an automatic or manual transmission that changes speed of the vehicle.

Figure 5:
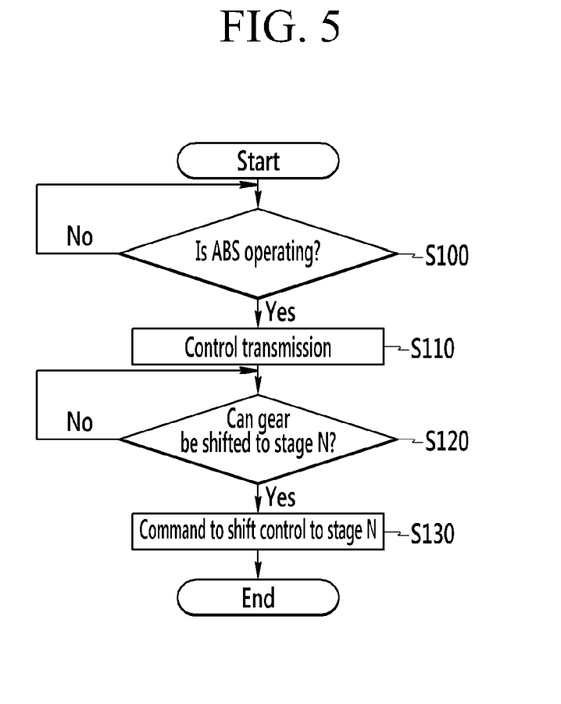
FIG. 5 is an exemplary flowchart of a shift control method according to the exemplary embodiment of the present invention.

A method for shifting a transmission (e.g., an automatic/manual transmission) to the stage N using the shift control system 100 will now be described with reference to FIG. 5. FIG. 5 is an exemplary flowchart of a shift control method according to the exemplary embodiment of the present invention. As shown in FIG. 5, the brake operation determiner 110 of the shift control system 100 may be configured to determine whether the ABS is operating by sensing the speed of the wheels (S100). When the brake is not operating, the braking of the vehicle may not be performed or executed, and therefore the brake operation determiner 110 may be configured to wait until the ABS operation is sensed. In other words, the brake operation determiner 110 may remain in an idle state until an ABS operation is sensed.

Further, in response to determining that the ABS is operating, the shift control determiner 120 may be configured to operate the transmission (S110). In particular, when the transmission is operated, the engine torque may be adjusted to be about zero to change the engine brake to be in the operating state and the motor torque may be adjusted to be about zero to prevent output of the motor torque. In addition, the engine clutch may be released. A method for controlling the engine torque, the motor torque, and the engine clutch is known to a person in the art, and therefore no further description will be provided in the exemplary embodiment of the present invention.

After the transmission is operated in S110, the shift control determiner 120 may be configured to determine whether the gear of the vehicle may be shifted to the stage N based on information regarding the vehicle condition received from an external source (S120). In particular, the vehicle condition information may include information regarding vehicle speed, a gear shift ratio, a fluid temperature, a motor torque, and an engine torque. In addition, the shift control determiner 120 may be configured to determine whether the vehicle speed is greater than a predetermined speed $\alpha$, whether the gear shift ratio is within predetermined gear shift ratios $\beta$ and $\gamma$ (where $\beta<\gamma$), and whether the fluid temperature is within predetermined temperatures $\delta$ and $\epsilon$ (where $\delta<\epsilon$). In addition, the shift control determiner 120 may be configured to determine whether the motor torque is less than a predetermined value $\zeta$, and determine whether the engine torque is less than a predetermined value $\eta$. In particular, the $\alpha$, $\beta$, $\gamma$, $\delta$, $\epsilon$, $\zeta$, and $\eta$ may be predetermined values, and may be set to various values according to a system design, and therefore the values are not limited to any specific value.

The shift control determiner 120 may be configured to determine that the vehicle gear may not be shifted to the stage N by detecting the above-stated vehicle conditions, and the process after S110 may be performed. Accordingly, the process for determining whether the shifting of the gear to the stage N in S120 may be iteratively performed with a predetermined time interval from braking of the vehicle until the braking is released. However, in response to determining that the shifting of the gear to the stage N is controllable, the shift control portion 120 may be configured to generate a control signal indicating gear shifting to the stage N (S130). The control signal may be transmitted to the transmission of the vehicle to cause the transmission to change the gear to the stage N.

Figure 6A:
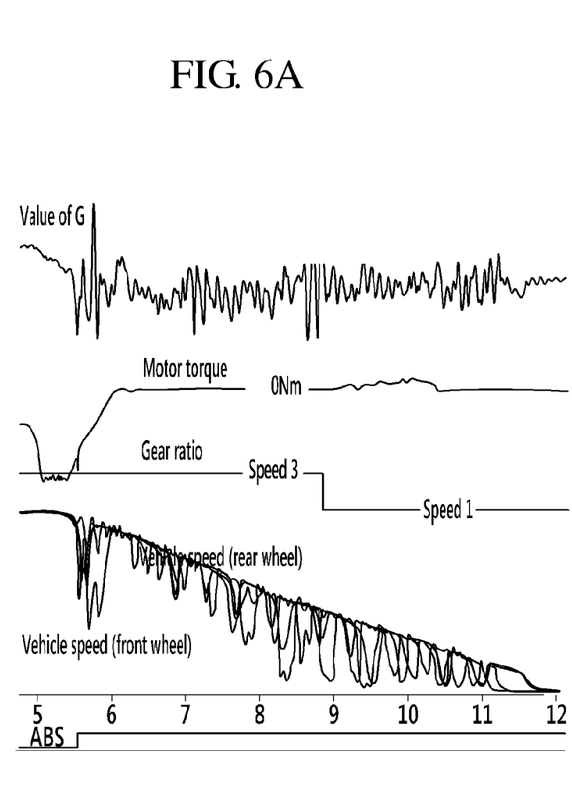
FIGS. 6A-6B are exemplary graphs illustrating vehicle vibration according to the exemplary embodiment of the present invention.
Figure 6B:
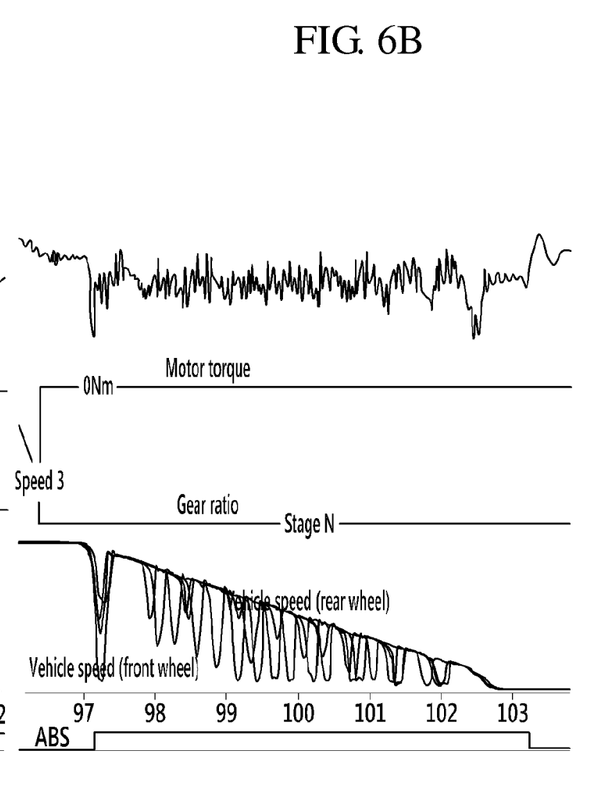

Vibration of the vehicle caused when the transmission is shifted to the stage N while the ABS is operating will be described with reference to FIGS. 6A-6B. In particular, FIGS. 6A-6B are exemplary graphs illustrating vehicle vibration according to the exemplary embodiment of the present invention. As shown in FIG. 6A, according to a conventional method, when an ABS is operating while the vehicle is being driven, the gear shift ratio may be reduced to a 1 speed from a 3 speed while maintaining the stage D and thus, vibration of the vehicle occurs. However, when the ABS is operating and the gear is shifted to the stage N as in the exemplary embodiment of the present invention, the vehicle vibration may be reduced as shown in FIG. 6B. Meanwhile the manual or automatic transmission is used in the specification, but the present invention is not limited thereto. That is, the spirit of the present invention may be applied to a continuously variable transmission equally or with modification.

According to the exemplary embodiment of the present invention, a vibration factor due to a motor and a transmission may be reduced while an ABS is operating to minimize vibration of the vehicle body. In addition, the sense of braking may be improved through shift control so that the present invention may be applied to hybrid vehicles and to ordinary vehicles.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. A system that controls a shift of a vehicle, comprising:
a memory configured to store program instructions; and
a processor configured to execute the program instructions, the program instructions when executed configured to:
determine whether an anti-lock brake system (ABS) of the vehicle is operating;
determine whether shifting to a neutral stage (N) is possible based on information regarding vehicle conditions after operating a transmission in response to determining that the ABS of the vehicle is operating;
generate a shift control signal and transmit the shift control signal to the transmission in response to determining that the vehicle can be shifted to the stage N; and
operate the transmission after releasing an engine clutch without adjusting an engine output and a motor output, or
operate the transmission after adjusting the engine output and the motor output and releasing the engine clutch, or
operate the transmission after adjusting the engine output and the motor output without releasing the engine clutch.

2. The system of claim 1, wherein the program instructions when executed are further configured to adjust the engine output and the motor output to be about zero, respectively.

3. The system of claim 1, wherein the program instructions when executed are further configured to adjust the sum of the engine output and the motor output to be about zero.

4. The system of claim 1, wherein the information regarding the vehicle conditions includes information regarding a vehicle speed, a gear shift ratio, a fluid temperature, a motor torque, and an engine torque.

5. The system of claim 1, wherein the program instructions when executed are further configured to determine whether the ABS is operating by sensing wheel speed of the vehicle.

6. The system of claim 1, wherein the system includes an electric brake system (EBS) and a hybrid control unit (HCU).

7. A method for a shift control system to control a shift of a vehicle, comprising:
determining, by a controller, whether an anti-lock brake system (ABS) is operating in a running vehicle;
operating, by the controller, a transmission of the vehicle when the ABS is operating;
determining, by the controller, whether the vehicle can be operated to a neutral stage (N) based on information regarding vehicle conditions, while operating the transmission of the vehicle; and
in response to determining that the vehicle can be operated to the stage N, generating, by the controller, a shift control signal and transmitting the signal to the transmission,
wherein when operating the transmission,
the transmission is operated after releasing an engine clutch without adjusting engine output and motor output, or
the transmission is operated after adjusting the engine output and the motor output and releasing the engine clutch.

8. The method of claim 7, wherein the engine output and the motor output are respectively adjusted to be about zero.

9. The method of claim 7, wherein a sum of the engine output and the motor output is adjusted to be about zero.

10. The method of claim 7, wherein the information regarding the vehicle conditions includes information regarding a vehicle speed, a gear shift ratio, a fluid temperature, a motor torque, and an engine torque.

11. The method of claim 10, wherein the determination of whether the shift of the vehicle can be operated to the stage N includes:
determining, by the controller, whether the vehicle speed is greater than a predetermined vehicle speed;
determining, by the controller, whether the gear shift ratio is within a predetermined gear shift ratio;
determining, by the controller, whether the fluid temperature is within a predetermined fluid temperature range; and
determining, by the controller, whether the motor torque and the engine torque are less than predetermined values.

12. The method of claim 7, wherein the determination of whether the ABS of the vehicle is operating is performed by sensing wheel speed.

13. A non-transitory computer readable medium containing program instructions executed by a controller, the computer readable medium comprising:
program instructions that determine whether an anti-lock brake system (ABS) is operating in a running vehicle;
program instructions that operate a transmission of the vehicle when the ABS is operating;
program instructions that determine whether the vehicle can be operated to a neutral stage (N) based on information regarding vehicle conditions, while operating the transmission of the vehicle;
program instructions that generate a shift control signal and transmitting the signal to the transmission in response to determining that the vehicle can be operated to the stage N; and
program instructions that operate the transmission after releasing an engine clutch without adjusting engine output and motor output, or
program instructions that operate the transmission after adjusting the engine output and the motor output and releasing the engine clutch.

14. The non-transitory computer readable medium of claim 13, wherein the engine output and the motor output are respectively adjusted to be about zero.

15. The non-transitory computer readable medium of claim 13, wherein a sum of the engine output and the motor output is adjusted to be about zero.

16. The non-transitory computer readable medium of claim 13, wherein the information regarding the vehicle conditions includes information regarding a vehicle speed, a gear shift ratio, a fluid temperature, a motor torque, and an engine torque.

17. The non-transitory computer readable medium of claim 16, further comprising:
program instructions that determine whether the vehicle speed is greater than a predetermined vehicle speed;
program instructions that determine whether the gear shift ratio is within a predetermined gear shift ratio;
program instructions that determine whether the fluid temperature is within a predetermined fluid temperature range; and
program instructions that determine whether the motor torque and the engine torque are less than predetermined values.

* * * * *